(12) United States Patent
Ott

(10) Patent No.: US 6,760,902 B1
(45) Date of Patent: Jul. 6, 2004

(54) METHOD AND APPARATUS FOR IMPLICITLY GENERATING AND SUPPORTING A USER INTERFACE

(76) Inventor: James Alan Ott, 1600 Ridgemont Dr., Austin, TX (US) 78723

(*) Notice: Subject to any disclaimer, the term of this patent is extended or adjusted under 35 U.S.C. 154(b) by 531 days.

(21) Appl. No.: 09/652,640

(22) Filed: Aug. 31, 2000

Related U.S. Application Data

(60) Provisional application No. 60/151,729, filed on Aug. 31, 1999.

(51) Int. Cl.[7] .................................................. G06F 9/44
(52) U.S. Cl. ........................ 717/113; 717/121; 345/763
(58) Field of Search ........................ 717/112–116, 121, 717/124–125; 707/101–103 R; 709/331–332; 715/516, 530; 345/619, 661, 738, 762–763

(56) References Cited

U.S. PATENT DOCUMENTS

| | | | | |
|---|---|---|---|---|
| 5,555,368 A | * | 9/1996 | Orton et al. ................. | 345/807 |
| 5,615,326 A | | 3/1997 | Orton et al. ................. | 345/807 |
| 5,668,997 A | | 9/1997 | Lynch-Freshner et al. .. | 709/329 |
| 5,808,611 A | | 9/1998 | Johnson et al. ............. | 345/804 |
| 5,832,270 A | * | 11/1998 | Laffra et al. ................ | 717/125 |
| 5,872,973 A | * | 2/1999 | Mitchell et al. ............ | 709/332 |
| 5,892,949 A | * | 4/1999 | Noble ......................... | 717/125 |
| 5,920,718 A | | 7/1999 | Uczekaj et al. ............. | 717/109 |
| 5,929,851 A | * | 7/1999 | Donnelly .................... | 345/762 |
| 5,973,702 A | * | 10/1999 | Orton et al. ................. | 345/619 |
| 6,052,515 A | * | 4/2000 | Bruckhaus ................... | 716/1 |
| 6,064,382 A | | 5/2000 | Diedrich et al. ............ | 345/700 |
| 6,230,309 B1 | * | 5/2001 | Turner et al. ............... | 717/107 |
| 6,425,016 B1 | * | 7/2002 | Banavar et al. ............. | 709/310 |
| 6,453,339 B1 | * | 9/2002 | Schultz et al. .............. | 709/206 |
| 6,463,442 B1 | * | 10/2002 | Bent et al. .................. | 707/103 R |
| 6,502,045 B1 | * | 12/2002 | Biagiotti ...................... | 702/66 |

\* cited by examiner

*Primary Examiner*—Kakali Chaki
*Assistant Examiner*—L J Shrader

(57) ABSTRACT

A method and apparatus that automatically creates the user interface in an object-oriented software program, without the need for explicit user interface code, is disclosed. The present invention includes a visual object base class with functions that support the creation and management of views, one or more instrumented object classes that are subclasses of the visual object base class and from which instrumented objects are created, and a Visualization Engine. Each instrumented object class defines one or more of the class members to be visual elements that are capable of being represented in the user interface environment. The Visualization Engine interacts with the visual object base class and each instrumented object created from the instrumented object classes, and, using a Global Class Table, a Class Descriptor, a View Descriptor, and an Object Descriptor, creates views of the instrumented objects and maintains synchronicity between the views and the underlying object members by generating the appropriate commands to the operating system.

20 Claims, 16 Drawing Sheets

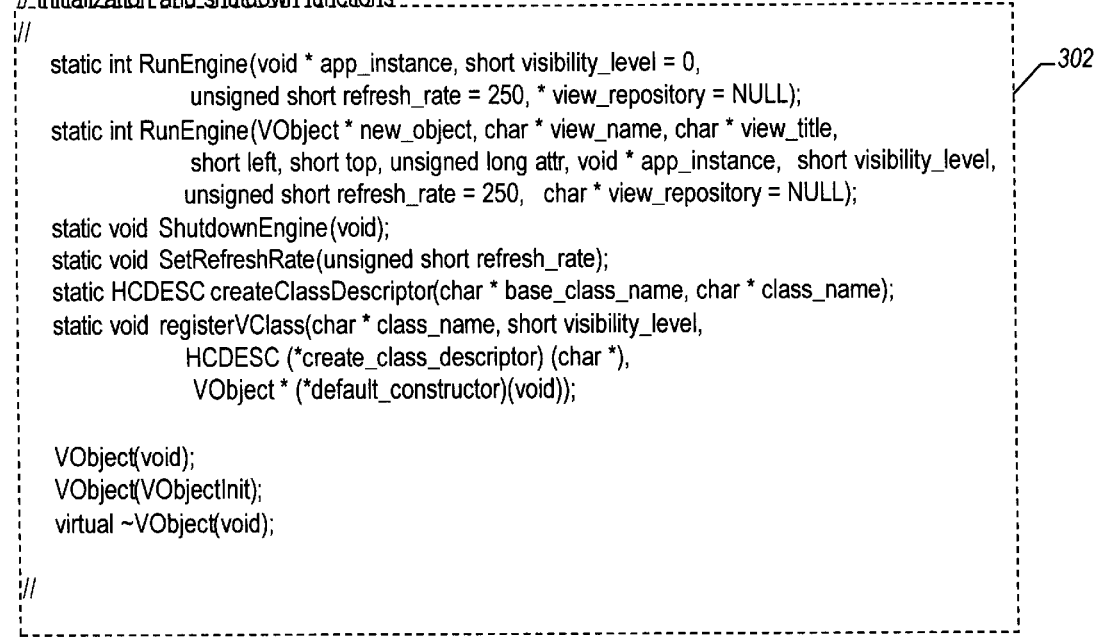

```
#ifndef __VOBJECT_HPP
#define __VOBJECT_HPP
//
//   Copyright (c) 2000 by Outerface Technologies Inc.
//   All Rights Reserved.
//
////////////////////////////////////////////////////////////
//////////////////////////////////////////////////////////// class VUSERDLL_CLASS VObject
{
public: // data
            HVINFO viewInfo;

public: // functions
//
// Initialization and shutdown functions
//
    static int RunEngine(void * app_instance, short visibility_level = 0,
              unsigned short refresh_rate = 250, * view_repository = NULL);
    static int RunEngine(VObject * new_object, char * view_name, char * view_title,
              short left, short top, unsigned long attr, void * app_instance,  short visibility_level,
              unsigned short refresh_rate = 250,   char * view_repository = NULL);
    static void ShutdownEngine(void);
    static void SetRefreshRate(unsigned short refresh_rate);
    static HCDESC createClassDescriptor(char * base_class_name, char * class_name);
    static void  registerVClass(char * class_name, short visibility_level,
              HCDESC (*create_class_descriptor) (char *),
              VObject * (*default_constructor)(void));

VObject(void);
    VObject(VObjectInit);
    virtual ~VObject(void);

```
// The following functions are created by the visiblity macros
//
    virtual unsigned short initializeDescriptor(HVDESC view_descriptor, HODESC object_descriptor,
                        VObject * v_object, unsigned short class_index,
                        unsigned short * view_index,
                        unsigned long view_type, unsigned short modeFlag );
    virtual char * getObjectName(void);
    virtual HVOBJECT getObjectHandle(void);
    virtual VObject * createPtrCopy(void);
    virtual void restoreFromPtr(VObject * ptr_copy);
//
```
— 312

```
// The following functions can be overridden if necessary
//
    virtual unsigned short dataChangeNotification(HMEMBER member_handle,
                        HVIEW view, unsigned short change_type);
//
```
— 310

FIG. 4B

// View creation and management functions
//
```
HVIEW createView(unsigned long view_type, char * view_name, char * view_title,
         HVWND parent, long left, long top, unsigned long attr );
HVIEW createView(unsigned long view_type, char * view_name, char * view_title,
         HVWND parent, POINT * point, unsigned long attr);
HVIEW createView(unsigned long view_type, char * view_name, char * view_title,
         HVWND parent, RECT * rect, unsigned long attr);
HVIEW createView(unsigned long view_type, char * view_name, char * view_title,
         HVIEW parent_view, long left, long top, unsigned long attr );
HVIEW createView(unsigned long view_type, char * view_name, char * view_title,
         HVIEW parent_view, POINT * point, unsigned long attr);
HVIEW createView(unsigned long view_type, char * view_name, char * view_title,
         HVIEW parent_view, RECT * rect, unsigned long attr);

int executeView(unsigned long view_type, char * view_name, char * view_title,
         HVWND parent, long left, long top, unsigned long attr);
int executeView(unsigned long view_type, char * view_name, char * view_title,
         HVWND parent, POINT * point, unsigned long attr);
int executeView(unsigned long view_type, char * view_name, char * view_title,
         HVWND parent, RECT * rect, unsigned long attr);

int executeView(unsigned long view_type, char * view_name, char * view_title,
         HVIEW parent_view, long left, long top, unsigned long attr);
int executeView(unsigned long view_type, char * view_name, char * view_title,
         HVIEW parent_view, POINT * point, unsigned long attr);
int executeView(unsigned long view_type, char * view_name, char * view_title,
         HVIEW parent_view, RECT * rect, unsigned long attr);

void showView(bool show_flag, HVIEW view = NULL);
void closeView(HVIEW view = NULL);
void enableView(bool enable_flag, HVIEW view = NULL);
void focusView(HMEMBER member_handle, HVIEW view, long reference_id=0);
void moveView(long x, long y, HVIEW view);
void sizeView(long width, long height, HVIEW view);
void drawView(RECT * update_rect, HVIEW view);
void syncView(HVIEW view = NULL);
HVIEW replaceView(HVIEW view, char * new_view_id, unsigned long new_view_type);
HVIEW getCurrentView(void);
HVIEW getVControlView(HMEMBER member_handle, HVIEW view, long reference_id=0);
```
/—304

FIG. 4C

```
// Member Variable functions void showVControl(HMEMBER member_handle, bool show_flag, HVIEW view, long reference_id=0);
    void enableVControl(HMEMBER member_handle, bool enable_flag, HVIEW view, long
                reference_id=0);
    void focusVControl(HMEMBER member_handle, HVIEW view, long reference_id=0);
    bool isVControlVisible(HMEMBER member_handle, HVIEW view, long reference_id=0);
    bool isVControlEnabled(HMEMBER member_handle, HVIEW view, long reference_id=0);
    bool isVControlFocused(HMEMBER member_handle, HVIEW view, long reference_id=0);

void syncVControl(HMEMBER member_handle, HVIEW view);
    void redrawVControl(HMEMBER member_handle, HVIEW view, long reference_id=0);
    void syncVariable(HMEMBER member_handle, HVIEW view);
    void syncAll(void);

// Member Function functions
    void showFControl(char * func_name, bool show_flag, HVIEW view, long reference_id=0);
    void enableFControl(char * func_name, bool enable_flag, HVIEW view, long reference_id=0);
    void focusFControl(char * func_name, HVIEW view, long reference_id=0);
    bool isFControlVisible(char * func_name, HVIEW view, long reference_id=0);
    bool isFControlEnabled(char * func_name, HVIEW view, long reference_id=0);
    bool isFControlFocused(char * func_name, HVIEW view, long reference_id=0);
    void syncFControl(char * func_name, HVIEW view);
    void redrawFControl(char * func_name, HVIEW view, long reference_id=0);

// Member Container functions
    bool selectContainerItem(HMEMBER member_container, VObject * select_object, bool select_flag);
    VSelectionList * getSelectionList(HMEMBER member_container);
    HWND getViewHWND(HVIEW view);

}; // class VObject
``` include <macros\object.mac>
include <macros\static.mac>

```
#ifndef __REGENTRY_HPP
define __REGENTRY_HPP
include <time.h> const unsigned short CREDIT = 0x0001;
const unsigned short DEBIT = 0x0002;

///////////////////////////////////////////////////////////// class RegisterEntry
{
    public:                     // data
            unsigned short type;
            time_t date;
            unsigned short number;
            string name;
            string memo;
            float amount;
            bool hasCleared;
            float runningBalance;

public:                     // functions
            RegisterEntry(void);
            RegisterEntry(const RegisterEntry & entry);
            RegisterEntry(istream & stream);
            virtual ~RegisterEntry(void);
            virtual RegisterEntry * createCopy(void);
            RegisterEntry & operator=(const RegisterEntry &entry);
            virtual bool operator<(const RegisterEntry &entry);
            ostream & operator<<(ostream & stream);
            istream & operator>>(istream & stream);
            bool operator==(const RegisterEntry &entry);
            bool operator!=(const RegisterEntry &entry) {return !operator==(entry);};
            void init(unsigned short _number);
            virtual void clear(void);
            virtual float getAmount(void) {return amount;};
};
#endif // __REGENTRY_HPP
```

FIG. 5A

```
#include "regentry.hpp"
```

/////////////////////////////////////////////////////////

```
RegisterEntry::RegisterEntry(void)
{
            type = 0;
            date = 0;
            number = 0;
            amount = 0;
            runningBalance = 0;
            hasCleared = false;
}

RegisterEntry::RegisterEntry(const RegisterEntry &entry)
{
            *this = entry;
}

•
                    •
                    •
 void RegisterEntry::init(unsigned short _number)
{
            number = _number;
            name = "";
            memo = "";
            amount = 0;
            runningBalance = 0;
            date = TDate();
            hasCleared = false;
} void RegisterEntry::clear(void)
{
            hasCleared = hasCleared ? false : true;
}
```

```
#ifndef __REGENTRY_HPP
define __REGENTRY_HPP include <vobject.hpp>        /*—502*/ include <time.h>
const unsigned short CREDIT = 0x0001;
const unsigned short DEBIT  = 0x0002;
/////////////////////////////////////////////////////////// class RegisterEntry : public VObject    /*—510*/
{
DECLARE_VISIBILITY(RegisterEntry)      /*—512*/ public:                    // data                          /*—504*/
        unsigned short type;
        time_t date;
        unsigned short number;
        string name;
        string memo;
        float amount;
        bool hasCleared;
        float runningBalance;

public:                    // functions                     /*—506*/
        RegisterEntry(void);
        RegisterEntry(const RegisterEntry & entry);
        RegisterEntry(istream & stream);
        virtual ~RegisterEntry(void);
        virtual RegisterEntry * createCopy(void);
        RegisterEntry & operator=(const RegisterEntry &entry);
        virtual bool operator<(const RegisterEntry &entry);
        ostream & operator<<(ostream & stream);
        istream & operator>>(istream & stream);
        bool operator==(const RegisterEntry &entry);
        bool operator!=(const RegisterEntry &entry) {return !operator==(entry);};
        void init(unsigned short _number);
        virtual void clear(void);
        virtual float getAmount(void) {return amount;};
};

DECLARE_VISIBILITY_CREATOR(RegisterEntry)    /*—514*/ endif // __REGENTRY_HPP include "regentry.hpp"
///////////////////////////////////////////////////////////
```

FIG. 6A

```
VISIBILITY_START(RegisterEntry, "Register Entry", 0, 10)
VVARIABLE(RegisterEntry, date, "Date", 0, 0)
VVARIABLE(RegisterEntry, number, "Num", 0, 0)
VVARIABLE(RegisterEntry, name, "Name", 0, 0)
VVARIABLE(RegisterEntry, memo, "Memo", 0, 0)
VVARIABLE(RegisterEntry, amount, "Amount", 0, 0)
VVARIABLE(RegisterEntry, hasCleared, "", 0, 0)
VVARIABLE(RegisterEntry, runningBalance, "Balance", 0, 0)
VVOID_FUNCTION(RegisterEntry, clear, "Clear", 0, 0)
VVARIABLE(RegisterEntry, type, "Type", 0, VNULL_CONTROL)
VISIBILITY_END
```
— 516

```
RegisterEntry::RegisterEntry(void)
{
        type = 0;
        number = 0;
        amount = 0;
        runningBalance = 0;
        hasCleared = false;
}

RegisterEntry::RegisterEntry(const RegisterEntry &entry)
{
        *this = entry;
}

•
                    •
                    • void RegisterEntry::init(unsigned short _number)
{
        number = _number;
        name = "";
        memo = "";
        amount = 0;
        runningBalance = 0;
        date = TDate();
        hasCleared = false;
} void RegisterEntry::clear(void)
{
        hasCleared = hasCleared ? false : true;
}
```
— 508

FIG. 6B

*object.createView(view_type, view_name,
                parent_window, left, top);

METHOD AND APPARATUS FOR IMPLICITLY GENERATING AND SUPPORTING A USER INTERFACE

This application claims the benefit of the earlier filed U.S. Provisional Pat. App. Ser. No. 60/151,729, filed 31 Aug. 1999 (31.08.99), entitled "Method and System For Providing Implicit Support For a User Interface," which is incorporated by reference for all purposes into this specification.

BACKGROUND OF THE INVENTION

1. Field of the Invention

The present invention relates to an object-oriented computer software technology and associated program development tools that support software application program developers and end users by generating a user interface for the application program, pursuant to the developer's or end user's specifications.

A portion of the disclosure of this patent document contains material that is subject to copyright protection. The copyright owner has no objection to any facsimile or reproduction of the material as it appears in the patent document or the patent disclosure, or as the material appears in the Patent and Trademark Office patent file or records, but otherwise reserves all copyright rights whatsoever.

2. Description of the Related Art

One of the most important aspects of a modern computing system is the interface between the human user and the machine. The earliest type of interface was text based; a user communicated with the machine by typing text characters on a keyboard and the machine communicated with the user by displaying text characters on a printer or display screen. More recently, graphic user interfaces have become popular where the machine communicates with a user by displaying graphics, including text and pictures, on a display screen and the user communicates with the machine both by typing in textual commands and by manipulating the displayed pictures with a pointing device, such as a mouse.

Many modern computer systems operate with a graphic user interface called a window environment. In a typical window environment, the graphical display portrayed on the display screen is arranged to resemble the surface of an electronic "desktop" and each application program running on the computer is represented as one or more electronic "paper sheets" displayed in rectangular regions of the screen called "windows".

Each window region generally displays information generated by the associated application program and there may be several window regions simultaneously present on the desktop, each representing information generated by one or more application programs. A program presents information to the user through each window by drawing or "painting" images, graphics or text within the window region. The user, in turn, communicates with the application by "pointing at" objects in the window region with a cursor which is controlled by a pointing device and manipulating or moving the objects and also by typing information using the keyboard. When objects within the window are selected or manipulated, the underlying application program is informed, via the window system, that the control has been manipulated by the user. The window regions may also be moved around on the display screen and changed in size and appearance so that the user can arrange the desktop in a convenient manner.

In current systems, the window environment described above is part of the computer operating system. The application program typically makes use of operating system functions by sending out series of task commands to the operating system, which then performs a requested task. For example, the application program may request that the operating system play an audible tone, display a warning window, printer dialog box, or other graphical information to the user in order to obtain the user's input to determine the next appropriate action. As computer systems have become more complex and more capable of multitasking, operating systems have evolved to include a central window manager that interfaces with each application program to ensure that each program's display data is separated from other displays, that the display is properly refreshed when windows are moved or resized by the user, and that user interaction with the display to provide input to the application program is properly communicated back to the application. The window manager also typically handles the high level facilities (buttons, sliders, list boxes and other controls) that application programs commonly use to provide a complete user interface.

Of course, these complexities behind displays and display management are invisible to computer users, who have come to expect simple, intuitive interfaces to even the most sophisticated computer programs. High-order computer languages, compilers, and operating systems have evolved to enable and provide implicit support to program developers for the creation and execution of even very sophisticated application programs. However, the same cannot be said when it comes to the design and development of a program's user interface. Indeed, historically, the user interaction space has never been considered to be a fundamental part of a computer program. User interface activities are often referred to as input and output, meaning that somehow data is extracted out of the program and displayed to the user and that somehow data is received from the user and put into the program. This "somehow" is accomplished by program developers writing explicit program code to get the data out of the program, format and display the data, receive input data from the user and put it back in to the program. Indeed, in addition to writing code to get data into and out of the program, the programmer must also write explicit code to create the look and feel that the programmer wants the user to experience when running and interacting with the program. The programmer must also ensure that user interface code properly interacts with the underlying program code so that they remain synchronized and the overall integrity of the system is maintained.

Due to the complexity of current graphical user interface environments, programmers often utilize specialized libraries of user interface code to reduce the amount of code they must write when providing support for the user interaction space. For example, Microsoft Corporation provides a class library for software developers known as the MICROSOFT FOUNDATION CLASS ("MFC") Library, which contains object classes implemented in C++ that are useful for programmers in developing user interfaces for object-oriented applications programs running on the MICROSOFT WINDOWS operating system. Nevertheless, even with the availability of class libraries such as MFC, application program developers must still spend an inordinate amount of development time dealing with interface implementation details, such as determining what type of control might be appropriate for certain input (e.g., button, menu bar, drop-down menu, dialog window, etc.); what color the image should be, how it should be labeled, where it should appear on the screen, etc. The user interface code for a new application program typically comprises a melange of library code, modified library code, and "from scratch" code cobbled together by the programmer to create the desired appearance and operation of the interface between the program and the user. Having to provide explicit code to support the user interaction space has the following disadvantages:

Bigger Programs—Adding explicit code to support the user interaction space greatly increases the size of the original program.

Increased Complexity—The complexity of a computer program is directly related to the amount of code contained within it. Consequently, supporting the user interaction space with explicit code results in a more complex program.

Compromised Integrity—Errors in the explicit code added to a computer program could result in data being erroneously input or displayed. This compromises the integrity of the entire system.

Direct Relationship Between Code and User Interface— Having to explicitly support the user interaction space means that for every variation in the user interface, a corresponding amount of code has to be created to support it.

Taken together, these problems explain why creating the user interface of a computer program often accounts for a significant (and indeed, unreasonable) portion of the development effort. Program developers should be primarily concerned with the task at hand—designing and developing a computer program that solves a real-world problem, or provides a useful function—and should not be mired in the implementation details of the user interface. From a program developer's standpoint, a computer program that is capable of generating its own user interface would represent an enormous improvement in the art.

The present invention, called OUTERFACING, fills this need by providing implicit support for the user interaction space in an object-oriented system. Programmers practicing the present invention in an object-oriented environment take advantage of the natural structural properties of objects and object systems and provide individual objects with the inherent ability to represent themselves in the user interaction space and to interact with the user. These representations, referred to in this disclosure as "views," are a collection of user interface controls that represent the data members and functions defined in a particular object class. Programs that incorporate the present invention can have state of the art user interfaces without the requirement for underlying explicit user interface code. Instead, the user interface is created by the program itself, which directly visualizes and interacts with the objects that exist within the program. In addition, the present invention provides an interactive "View Editor" which enables program users to interactively create and save views of objects.

SUMMARY

The present invention comprises a method and apparatus that automatically creates the user interface in an object-oriented software program. The present invention includes a visual object base class that comprises functions that support the creation and management of views, one or more instrumented object classes that are subclasses of the visual object base class and from which instrumented objects are created, and a Visualization Engine. Each instrumented object class further comprises a block of functions that define one or more of the class members to be visual elements that are capable of being represented in the user interface environment. The Visualization Engine further comprises an Object Manager, a Visualization Manager, a Synchronization Manager, and a Repository Manager. The Visualization Engine interacts with the visual object base class and each instrumented object created from the instrumented object classes, and, using a Global Class Table, a Class Descriptor, a View Descriptor, and an Object Descriptor, creates views of the instrumented objects and maintains synchronicity between the views and the underlying object members by generating the appropriate commands to the operating system. Each view created by the Visualization Engine comprises a representation of one or more of said visual elements of each said instrumented object that is meaningful to a human user.

The present invention also comprises a View Editor that enables real-time interactive modification of object views. The present invention also allows instrumented object classes to be derived from other instrumented object classes, and when this occurs, views associated with the parent instrumented object class are inherited by the derived instrumented object class.

BRIEF DESCRIPTION OF THE DRAWINGS

To further aid in understanding the invention, the attached drawings help illustrate specific features of the invention and the following is a brief description of the attached drawings:

FIGS. 4A–4D show a simplified exemplary Visual Object base class, according to one embodiment of the present invention.

FIGS. 5A and 5B show a simplified exemplary object class that is an "ideal solution."

FIGS. 6A and 6B show the same object class, after it has been instrumented in accordance with one embodiment of the present invention.

DETAILED DESCRIPTION OF THE INVENTION

The present invention, called OUTERFACING, comprises a method and apparatus that implicitly supports the user interaction space and generates the user interface in an object-oriented system. It takes advantage of the natural structural properties of objects and object systems and provides individual objects with the inherent ability to represent themselves to the user and to interact with the user. In this disclosure, the term "user interaction space" denotes an abstract "space" in a computer system that encompasses all aspects of representing program data in a form usable by the human user, and all means by which the human user interacts with the program and manipulates the data. In prior art computer programs, the user interaction space generally excludes the code and data that comprises the major functionality of the program, and includes the code specifically generated by the programmer to provide the user interface. In the present invention, as described herein, the code and data that comprises the major functionality of the program also supports the user interaction space by virtue of the addition of novel interface-related functionality that enables the direct visualization of the objects and object members contained with in the program.

This disclosure describes numerous specific details that include specific software structures and example instruction streams in order to provide a thorough understanding of the present invention. One skilled in the art will appreciate that one may practice the present invention without these specific details.

Figure 1:
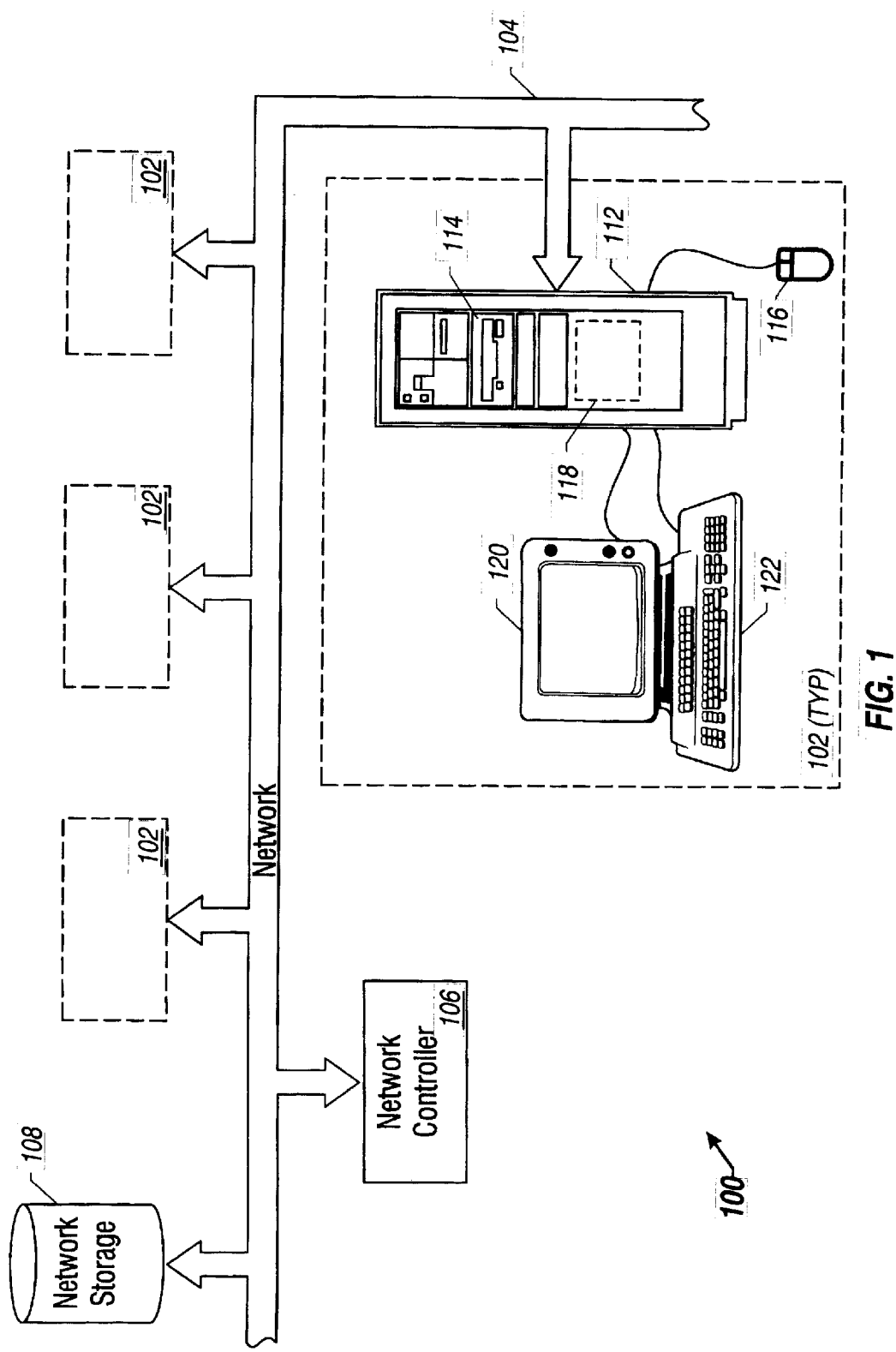
FIG. 1 shows a typical networked computer environment.

The present invention is preferably practiced in the context of a standalone or networked personal computer such as that depicted in FIG. 1. In FIG. 1, typical network 100 includes one or more computer workstations 102 networked together via network connection 104, which is controlled by network controller 106. The network 100 may also include various peripheral devices, such as network storage device 108 and one or more printers (not shown in FIG. 1). Typical computer workstation 102 includes computer 112, internal storage media such as RAM 118, external storage media such as a floppy disk 114, and various interface devices such as a mouse 116, a monitor 120, and a keyboard 122. Although a particular computer may only have some of the units illustrated in FIG. 1, or may have additional components not shown, most computers will include at least the units shown.

Figure 2:
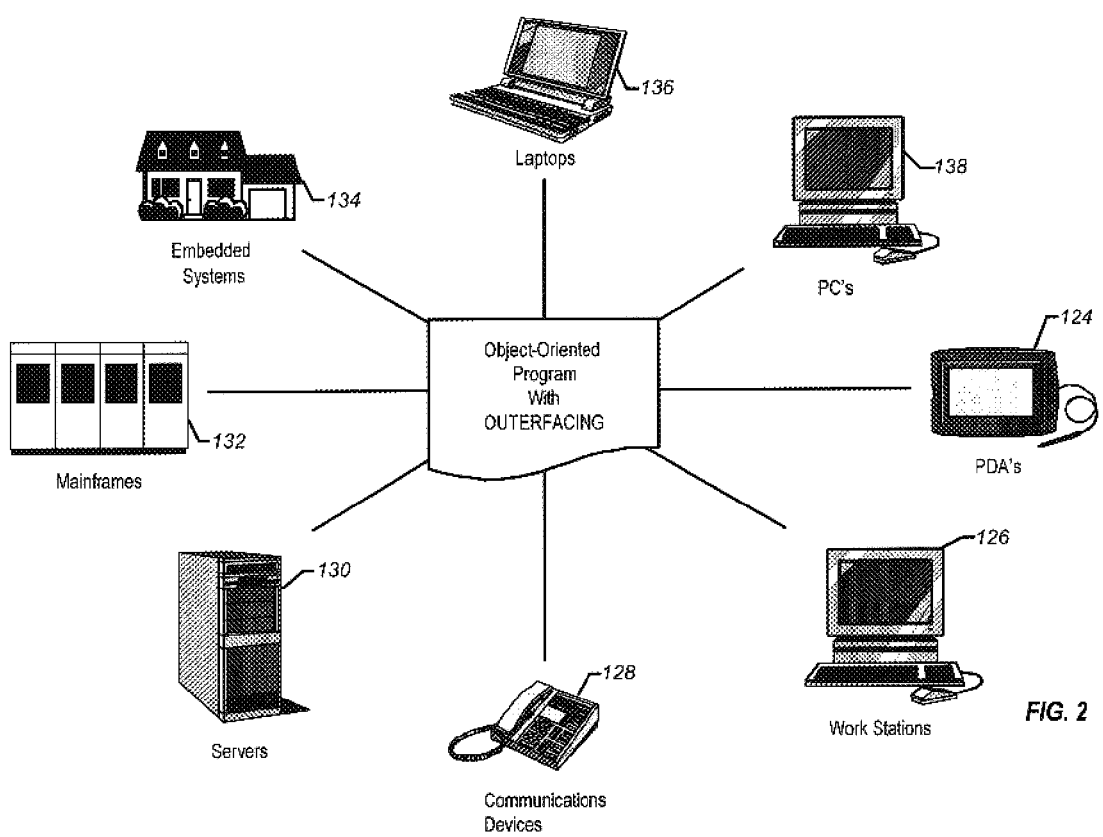
FIG. 2 shows exemplary platforms for which the present invention is capable of creating a human interface.

The present invention may also be practiced in the context of object-oriented programs running on any of the platforms shown in FIG. 2, including but not limited to personal data assistants 124, workstations 126, communications devices 128, servers 130, mainframes 132, embedded systems 134, laptops 136, or personal computers 138. Programs running on these platforms must still receive data and output data in a form usable by the human operator. Human operators of these platforms must be able to interact with programs and manipulate program data as required. The present invention provides a means to do so, without the need for extensive program development efforts directed toward creating the specific interface implementation required for each platform.

In the embodiment described herein, the present invention is implemented in the C++ programming language using object-oriented programming techniques. C++ is a compiled language, that is, programs are written in a human-readable script and this script is then provided to another program called a compiler, which generates a machine-readable numeric code that can be loaded into, and directly executed by, a computer. Those skilled in the art are very familiar with C++, and many articles and texts are available which describe the language in detail. While the exemplary embodiment detailed herein is described using C++ code fragments and pseudo-code, those skilled in the art will understand that the concepts and techniques disclosed herein can be practiced by programmers writing in any higher-order object-oriented programming language, such as Java, without departing from the present invention.

In addition, this specification describes the present invention in the context of its application to an "ideal solution," meaning an object-oriented computer program without explicit interface code. Those skilled in the art will understand that this description and context is not intended to imply any limitation of the present invention to ideal solutions. While the most efficient use of the present invention would be to utilize the concepts and techniques disclosed herein from the beginning of a new software development effort, those skilled in the art will recognize that the present invention is also highly useful and applicable to modernize, streamline, and customize existing computer programs and new programs created from existing code libraries. Finally, the present invention can be adapted and incorporated into any object-oriented application program currently running on any operating system.

As will be understood by those skilled in the art, object-oriented programming techniques involve the definition, creation, use, and destruction of "objects". These objects are software entities comprising data elements and routines, or functions, which manipulate the data elements. The data and related functions are treated by the software as an entity and can be created, used, and deleted as if they were a single item. Together, the data and functions enable programmers to use objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions that manipulate the data. An object is actually created in the program by means of a special function called a constructor, which uses the corresponding class definition and additional information, such as arguments provided during object creation, to construct the object. Objects are used by invoking their functions and using their data.

The primary benefits of object-oriented programming techniques arise out of three basic principles; encapsulation, inheritance, and polymorphism. Encapsulation refers to the capability of an object to hide, or encapsulate, all or a portion of its internal data structure and functions. More particularly, during program design, a program developer can define objects in which all or some of the data variables and all or some of the related functions are considered "private" or for use only by the object itself. Other data or functions can be declared "public" or available for use by other objects, or they can be declared "protected," which means that they are only available to objects through inheritance.

The principle of inheritance allows a software developer to declare classes (and the objects which are later created from them) as related. Specifically, classes may be designated as subclasses of other base classes. Such a subclass is said to be derived from is base class. A subclass "inherits" and has access to all of the non-private functions and data of its base classes just as if these functions and data appeared in the subclass. Inheritance allows software developers to easily customize existing code to meet their particular needs, and indeed, to modify existing programs to practice the present invention. As explained in further detail below, the present invention makes use of the principle of inheritance by adding a base class called Visual Object, whose data and functionality is then inherited by all other objects for which user interaction is desired.

The third important principle in object-oriented programming is polymorphism. Programmers generally consider the principle of polymorphism to encompass two distinct concepts. The present invention uses both functionalities of polymorphism as described below.

The first aspect of polymorphism is the ability of objects to override a function inherited from a base class and replace it with a function that has the same overall format but provides functionality unique to the subclass. These types of polymorphic functions are usually referred to as "virtual" functions. Virtual functions enable programs to interact with objects of derived classes at the level of the derived objects' base class, but to produce results unique to the actual subclass, not the base class.

To illustrate the benefit of virtual functions in object-oriented programming, consider the following example. Assume we have a set of classes that represent simple geometric shapes such as circles, squares and triangles. We could create a base class called "shape" which has functions common to all shapes regardless of their actual type. "Shape" can be designated a base class for the circle, square and triangle classes, thus allowing us to perform various activities on shape objects without having to be specifically aware of their actual type. One such common activity to perform on a shape is to calculate its area; however the formulas for calculating the area of a circle, square and triangle are all different. We can easily define a virtual function in the shape class called "CalculateArea". We can then override this function in each subclass by defining a "CalculateArea" function which performs the appropriate area calculation in each of the derived classes. During program execution we could ask a shape object to calculate its area and the proper function would dynamically be called. As this example shows, virtual functions allow programs to solve complex problems in a simple, generalized fashion. As explained in further detail below, the present invention makes use of virtual functions to add interface-related functions to object classes within the program that are then used to create the human interface.

The second aspect of polymorphism used by object-oriented programmers is commonly known as "function overloading" or "operator overloading." Function or operator overloading refers to a concept whereby functions that have the same name but different types and/or number of parameters can be utilized within a program. For example, an addition function may be defined as variable A plus variable B (A+B) and this same format can be used whether A and B are integers, characters, or dollars and cents. However, the actual program code that performs the addition may differ widely depending on the type of variables that comprise A and B. Function overloading allows three separate function definitions to be written, one for each type of variable (integers, characters, and dollars). After the functions have been defined, a program can later refer to the addition function by its common format (A+B) and, during compilation, the C++ compiler will determine which of the three functions is actually being used by examining the variable types. The compiler will then substitute the proper function code. Overloading allows programs to be written in a more clear and concise manner. As explained in further detail below, the present invention makes use of function overloading to simplify the interface between an object system and its user interface.

Figure 3:
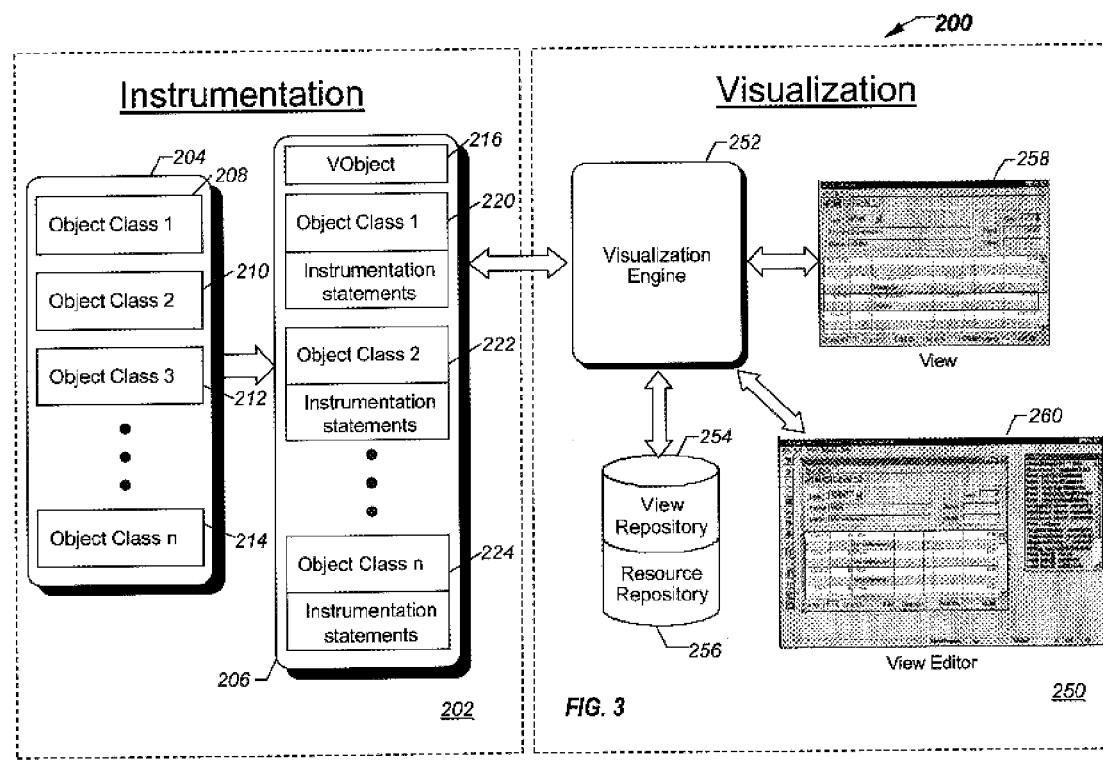
FIG. 3 shows the major components of the instrumentation phase and the visualization phase of the present invention, according to one embodiment of the present invention.

As shown in FIG. 3, the present invention 200 consists of two phases: Instrumentation 202 and Visualization 250. During Instrumentation 202, the programmer creates an Instrumented Object System 206 by adding the minimum set of functionality and data necessary for objects in the program to operate in the user interaction space. As described in further detail herein, one method of instrumentation involves starting with an ideal solution 204. In this specification, as described above, an "ideal solution" is an object-oriented computer program that accurately models the real-world problem that the program is designed to solve, and that excludes explicit user interface code. In this specification, the ideal solution 204 receives input, solves the problem, and outputs the solution. A current-technology object-oriented program with all user interface code stripped away is an ideal solution, as that term is used herein.

Returning to FIG. 3, ideal solution 204 is comprised of objects defined by object classes 1 through N (208, 210, 212, 214). From the ideal solution 204, the programmer creates an instrumented object system 206 by adding a visual object base class ("VObject") 216 and instrumenting each object class (220, 222, 224) that includes functions or data that may be of interest in the user interaction space. As described in further detail herein, instrumenting a class comprises adding a set of instrumentation statements to the ideal solution object class.

During Visualization 250, the Visualization Engine 252 interacts with the instrumented object system 206 to create one or more views 258. As shown in FIG. 3 and discussed in further detail below, the Visualization Engine 252 also interacts with the View Repository 254, the Resource Repository 256, and the View Editor 260 to produce a representation of an object within the user interaction space and to maintain the synchronization between the object and the representation.

Instrumentation

Instrumentation is performed on each object class in an object-oriented system for which user interaction is desired. Object classes and their corresponding objects that have been instrumented as described below are said to be instrumented object classes and instrumented objects, respectively. Instrumentation is accomplished through the following steps:

1) Addition of the Base Visual Object Class and Inheritance of its Common Functionality.

Programmers practicing the present invention first create a base class called Visual Object ("VObject"). VObject contains the functions that provide the basis for almost all interaction between the instrumented object system and the Visualization Engine. Instrumented objects utilize these functions to create and manipulate views and the Visualization Engine utilizes these functions to create the object and class specific data structures required for visualization. VObject also includes functions relating to the initialization and shutdown of the Visualization Engine.

VObject is declared to be a base class for all other object classes that include functions or data that may be of interest in the user interaction space. The inheritance chain thus provides a common base class—VObject—for all instrumented object classes. This allows instrumented objects created from the instrumented object classes to inherit the functionality and data of the VObject class, and to be treated as visual objects during the visualization process. FIGS. 4A–4D show an example class definition for VObject, according to one embodiment of the invention. From the VObject base class, each instrumented object class inherits the following functionality:

1) Visualization Engine initialization and shutdown—these functions, shown in FIG. 4A at 302, provide the capabilities to control the Visualization Engine and various aspects of the Visualization Engine's operation such as the refresh frequency for the user interface.

2) View creation and management—these functions, shown in FIGS. 4C and 4D, create and manipulate views (block 304) in FIG. 4C, and manipulate the controls within a view relative to the member item that the control represents (block 308 in FIG. 4D).

3) Data synchronization—This polymorphic function, shown at 310 in FIG. 4B, provides the means by which the Visualization Engine interacts with instrumented objects to notify objects when their member variables' data, or visual representation changes. By overriding this function, the programmer can control how an object responds to these changes.

4) Object access and manipulation—This set of polymorphic functions, shown at 312 in FIG. 4B, provides the functionality needed to access and manipulate an instrumented object and its instrumented member data and functions. These functions provide the capability to create the data structures required for visualization that are utilized by the Visualization Engine to create views and maintain synchronization between the views and the objects that they represent. These functions are overridden during instrumentation to provide unique functionality for each instrumented class. These functions, and their associated visibility macros in a C++ implementation, are described in more detail below.

Those skilled in the art will appreciate that the example VObject class definition shown in FIGS. 4A–4D, and its interaction with the instrumented object classes and the Visualization Engine as described herein, is intended to illustrate the types of visibility-related functions that the visual object base class adds to its instrumented object subclasses by virtue of inheritance, and the way that those functions are utilized by the Visualization Engine. The sample VObject base class and sample instrumented object classes provided herein are included to illustrate the concepts embodied by the present invention, and are not intended to imply that the present invention requires the specific coding methodology or approach shown in the examples.

In a preferred embodiment, the instrumented object classes also inherit a single data member called a visualization handle from the VObject base class. The visualization handle is used to provide information about the visual representations of the object during the visualization process. This handle is initialized by the Visualization Engine when an object is visualized. It is used by the Visualization Engine to maintain a list of the current visualizations associated with the instrumented object. If no views are associated with the instrumented object, the visualization handle is set to a null value. This allows the object to immediately know if it has any views associated with it. When an instrumented object is deleted, the instrumented object tests this value to determine if it is currently being visualized. If it is, then the instrumented object notifies the Visualization Engine so that the associated visualizations can be removed.

In a preferred embodiment, VObject includes only the single data member—the visualization handle—to insure that only one data member is added to each instrumented object instance. This, in turn, insures that the present invention has minimal impact on each instrumented object's memory requirements. This is important because memory is a limited resource and the overhead associated with moving or copying objects is directly related to the size of an object.

In one embodiment the visualization handle is implemented as a pointer which adds four bytes to the object's size.

2) Addition of Global Class Functions

In an object-oriented system, functions can be specific to an object instance or general to a class. In the first case, an object instance must exist before the function is accessed. In the latter case, the function is a global class function that can be accessed at any time. In C++ these types of functions are called "static" functions. The present invention utilizes global class functions when adding functionality to create the instrumented classes. The programmer practicing the present invention adds the following global class functions during the instrumentation process:

Class Registration—This function notifies the system of the existence of the instrumented class.

Class Descriptor Creation—This function creates a description of the instrumented class.

Default Object Constructor—This function creates an instance of the instrumented class and returns it as a Visual Object.

In one embodiment utilizing the C++ programming language, those skilled in the art will understand that these global class functions can be added by the use of macros. The example provided below, which illustrates the instrumentation process, utilizes C++ macros to provide these three global class functions.

3) Addition of Polymorphic (Virtual) Functions

As described above, when a derived class inherits functionality from its base class, it can override the inherited function with an analogous function (a polymorphic or virtual function) specific to the derived class. When executing a polymorphic function, the actual function called depends on the object's type. The programmer adds analogous polymorphic functions to customize the instrumented objects' behavior, and the appropriate function is then dynamically called during program execution, depending upon the type of the derived class. During instrumentation, the programmer adds the following polymorphic functions to each class that contains elements that may be of interest in the user interaction space:

Initialize Descriptor—This function will initialize one of three data structures: the Class Descriptor, the View Descriptor, or the Object Descriptor. These structures are discussed in more detail below.

Get Object Name—This function returns the class name for this instance of the instrumented class.

Get Object Handle—This function returns a handle to this instance of the instrumented class. In one embodiment, the object handle is a pointer to the object instance useful in associating objects with their views.

Create Object Copy—This function creates a copy of this instance of the instrumented class and returns a Visual Object pointer to it.

Restore Object—This function copies the contents of an object of the instrumented class into this instance of the instrumented class.

The Visualization Engine uses these functions to create the data structures required by the visualization process, to manipulate the instrumented object when it is visualized, and to maintain synchronization between the instrumented object and its associated visualizations.

To illustrate the instrumentation process, consider the following example. Suppose a software developer is creating a program that functions as an electronic checkbook and register, such as might be used for on-line bill paying. Such a program would need to enable the user to track checking account activity and to access pertinent information, such as the user's running balance. A simple object-oriented program to accomplish this task would include check register entry objects, each of which would correspond to the entry a user typically makes in a check register that corresponds to a check written (a debit entry) or a deposit made (a credit entry). The electronic checkbook program would also need to include objects that correspond to the actual transactions reflected by checks and deposits (designated in this example as transaction objects). Finally, the program also needs to include a check register object, which is a collection of the register entries. Therefore, the programmer writing this program would need to create a register entry class, a transaction class, and a check register class.

Continuing with the register entry class object as an example, the register entry class would include a debiting function and a crediting function. The class data elements would include the type of data that normally appears in a check register, such as the date of the check or deposit, the type (debit or credit), the relevant amount, the payee (for debit entries), and the running balance. The programmer might also want to include a "memo" data field, to enable the user to note the purpose of checks or the source of deposits, and a status field, where the user might want to note whether checks had cleared.

FIGS. 5A and 5B provide an example partial listing of C++ code that a programmer might write to create the register entry class from which the register entry objects will be defined. The class definition code shown in FIGS. 5A and 5B comprises an "ideal solution," i.e., it does not include any specific user interface code. Those skilled in the art will recognize that the code block designated 404 in FIG. 5A comprises the data elements of the register entry object class as described above. For example, variable "type" is an unsigned integer identifying credit entries and debit entries; "name" is a string variable that corresponds to the payee name; "runningBalance" is a floating point variable that corresponds to the running balance, and so on. Code block 406 identifies the functions of the register entry class. Finally, code block 408 in FIG. 5B represents the portion of the class creation code that defines each function identified in block 404. For brevity, FIG. 5B provides only a few representative functions; those skilled in the art will recognize that in reality, each class function identified in block 406 will be defined in block 408. The functions identified in block 406 and defined in block 408 represent functions required for manipulation of a check register entry, including getting and converting the data, constructing the entry, copying the entry, and voiding the entry.

FIGS. 6A and 6B show the same class definition code after instrumentation according to one embodiment of the present invention. The instrumented class shown in FIGS. 6A and 6B comprises the same code blocks and structure as that shown in FIGS. 5A and 5B: a block 504 that defines the class's data elements, a block 506 that identifies the class's functions, and a block 508 that comprises code that defines each function identified in 506. After instrumentation, however, the class definition code shown in FIGS. 6A and 6B is slightly different from that shown in FIGS. 5A and 5B. Block 502 adds an include statement for the file containing the VObject class declaration. Block 510 adds the base class VObject to the inheritance chain. Statement 512 uses a C++ macro called DECLARE VISIBILITY to declare the register class, create Class Descriptor, default object constructor, initialize descriptor, get object name, get object handle, create pointer copy and restore from pointer member functions. Statement 514 also uses a C++ macro to insure that instrumented objects that are member objects of other instrumented objects are understood to be VObjects and will be handled correctly. Finally, block 516 uses a set of C++ macros to create the actual functions declared by statement 512 and define exactly which data and functions within the class are to be "visible"—meaning that they can operate in the user interaction space.

In addition to instrumenting objects that are derived directly from VObject, the present invention allows objects derived from other instrumented objects to be instrumented as well. For example we could derive a class called "ExtendedRegisterEntry" from the class "RegisterEntry". In this class we will add a couple of extra data members, "dateCleared" which indicates the date the check was processed by the bank and "floatTime" which indicates the number of days between the time the check was written and the time the check was processed by the bank. We could also override the virtual function "clear" found in the "RegisterEntry" class with a version that will clear the check and calculate the floatTime based on the current date.

This new derived class is instrumented using the same process as described above in conjunction with the register entry class, given that the data and functionality of "RegisterEntry" are already resident within "ExtendedRegisterEntry." To instrument "ExtendedRegisterEntry," "RegisterEntry" is defined as a base class for this class, and the variables and functions unique to the "ExtendedRegisterEntry" are added as visible members and created as visible items. This is because the properties of inheritance and polymorphism inherent in object-oriented systems extend to instrumented objects and their associated visualizations. This means that object visualizations are inheritable—meaning that instrumented objects derived from other instrumented objects can be visualized using any of the base object's view definitions. It also means that visualizations are polymorphic. In other words, if an instrumented object is derived from another instrumented object and they both have a view of the same type and name, then the view used will be determined dynamically at runtime.

Those practiced in the art will appreciate the power and flexibility that these features provide, particularly in the context of large object oriented systems.

Visualization

After each object class that contains functions and/or data that is of interest to the user is instrumented in accordance with the above process and the necessary Visualization Engine initialization calls have been added to the program's startup code, the program is ready to be compiled and visualized. When the program is running, the instrumented object system interacts with a block of functionality called the Visualization Engine to create object visualizations. According to one embodiment, the Visualization Engine is packaged as a Dynamic Link Library (DLL) that is linked with the program containing the instrumented object system. In other embodiments of the present invention, the Visualization Engine is a separate executable program, running on the same machine or even running on a different machine that is networked to the machine running the program that includes the instrumented object system. In the latter case an instrumented object system has the capability to be visualized remotely.

Figure 7:
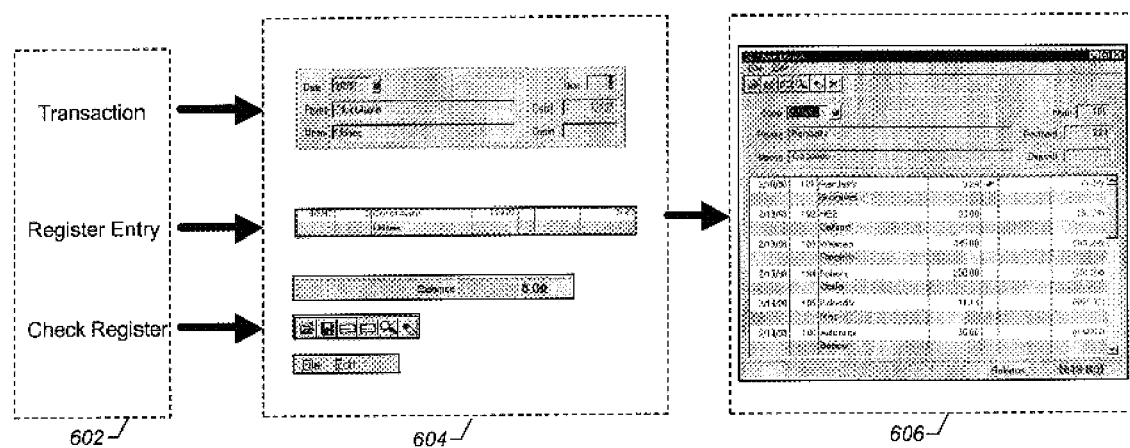
FIG. 7 illustrates the creation and assembly of individual object views and from those views, a typical user interface.

The Visualization Engine interacts with each instrumented object to create a visual, aural, or other representation of the object that is meaningful to a human user. This representation, whether it is manifested as a visual representation, an audible tone, synthesized speech, or any other meaningful representation, is referred to in this disclosure as a view. To create views and ultimately, the user interface, the Visualization Engine maps the underlying data types of the member variables and functions onto the user interface elements available in a user interface environment. The progression from instrumented object, to views, to the user interface in a graphical user interface environment such as the WINDOWS environment is shown conceptually in FIG. 7. Continuing with the electronic checkbook example, the instrumented Transaction, Register Entry, and Check Register objects 602 are transformed into views 604, which are then combined to create the user interface for the program 606.

Figure 8:
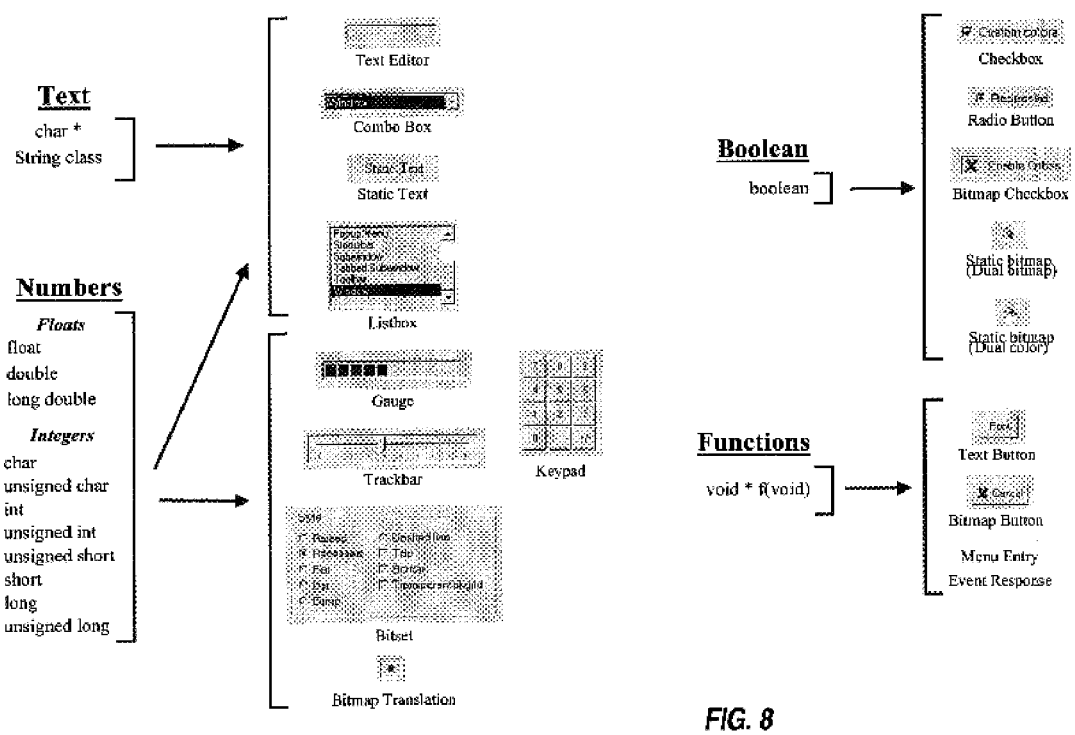
FIG. 8 shows example object data and function visualizations appropriate for a graphical user environment.
Figure 9:
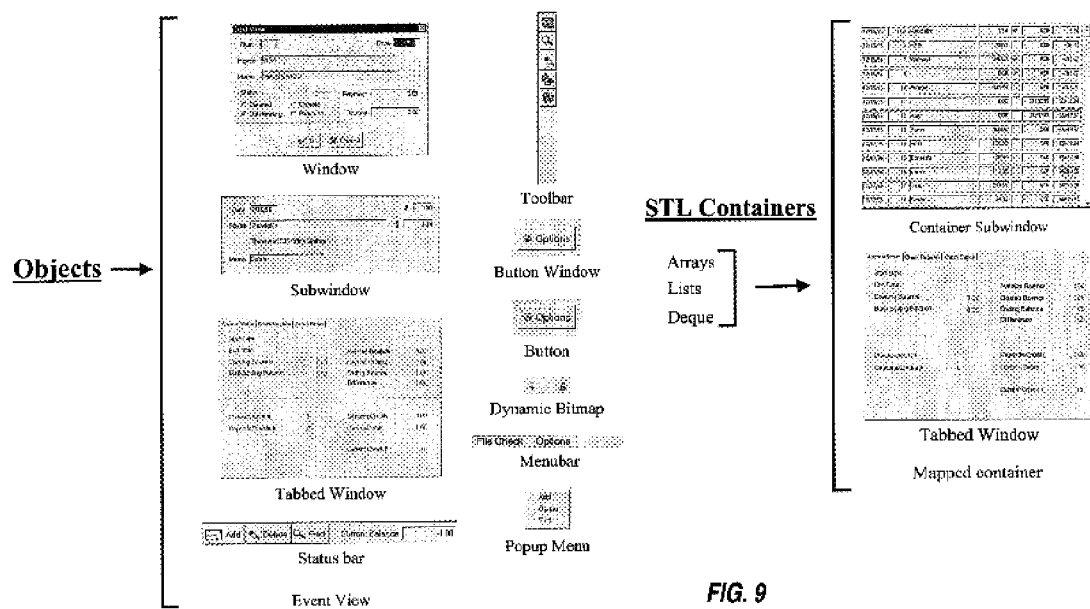
FIG. 9 shows example object visualizations appropriate for a checkbook register program in a graphical user interface environment.

By supporting different control sets, the Visualization Engine can create representations appropriate for a particular environment. For example, in the graphical user interface environment shown in FIG. 7, objects and object members can be visualized as a button, bitmap, menu bar, toolbar, dialog box, or other user interface element or combination of user interface elements. Some of the options available for object member visualization in a graphical user interface environment such as WINDOWS are shown in FIG. 8. Similarly, some of the options available for object visualization, including standard template library containers, are shown in FIG. 9. Those skilled in the art will be familiar with the creation of the WINDOWS-type visualizations shown in FIGS. 8 and 9 using prior art tools, such as MFC, and will appreciate how the present invention creates the same visualizations but requires much less effort on the part of the programmer. Similarly, as discussed in more detail below, those skilled in the art will appreciate how the present invention simplifies modification of the user interface enormously, because it allows the programmer and the user to change member and object visualizations without changing the underlying program source code. In other words, the present invention allows the user to change the representation of an object from a dialog box to a toolbar to a bitmap, and so forth. Users can change the representation of an object variable from a gauge to a trackbar to a text editor, and so forth. Those skilled in the art will appreciate that this enables virtually an infinite variety of user interfaces to be created for a given program. Moreover, the present invention's interface-generating capabilities and flexibility allows different users of the same program running on the same machine or network to individually customize their interface to one that they find easiest or most useful for their needs. Likewise, program developers can utilize the same capabilities and flexibility to customize interfaces for targeted groups of users, or for individual customers.

Practitioners and users of the present invention have the same flexibility in non-WINDOWS or non-graphical interface environments. For example, in a character-based environment a different set of controls can be used to represent the object and its members in a purely textural manner. And in a non-visual environment the Visualization Engine can represent objects using non-visual controls such as sounds or computer generated speech. Furthermore, the Visualization Engine can simultaneously create a graphical and a non-visual representation of the same object. For example, consider the transaction object view shown at the top of block 604 in FIG. 7 that looks like a check. Instead of (or in addition to) the graphical view shown in FIG. 7, a user might direct the Visualization Engine to visualize the transaction object using computer-generated speech. The Visualization Engine would then generate the appropriate commands to the computer's operating system that result in the computer "reading" the transaction object's variable names (date, payee, etc.) and their corresponding values (Sep. 2, 1997, City of Austin, etc.) aloud to the user.

To comprehend the operation of the Visualization Engine, the reader must first understand four important data structures that are either created by or used by the Visualization Engine to generate views for the user interface.

Global Class Table—This data structure is created during program initialization. During the initialization phase of the program's execution the Class Registration global class function for each instrumented object class is called. This causes a new entry to be added to the Global Class Table. The Global Class Table contains an entry for every instrumented object class. Each entry contains the class name and handles to the Class Descriptor Creation function and the Default Object Constructor functions. (As the reader will recall, the Class Registration function, the Class Descriptor Creation function, and the Default Object Constructor function are global class functions added to a class during instrumentation.) There is only one Global Class Table for an object system.

Class Descriptor—This data structure is created when an instrumented object's Class Descriptor Creation function is executed. This data structure describes the structure of an instrumented class. The Class Descriptor data structure contains one entry for each instrumented member of an instrumented class, plus an entry for the class itself. Each entry contains the name, data type, and access information for the class member. There is a Class Descriptor data structure for each instrumented object class in an object system. In one embodiment of the invention the Class Descriptor entry consists of the following:

Internal Name—This is the name defined for the item in the class definition.

External Name—This is the default name to be display when visualizing the item.

Data type Name—This is the data type of the item.

Member Offset—This is the relative position of the item within the object structure.

View Descriptor—This data structure is created by the Visualization Engine and initialized by the instrumented object's' Initialize Descriptor polymorphic function. It describes a visual or other representation for each instrumented object class. It contains one or more entries for each instrumented class member that is to be represented within the view. Each entry contains information about the type, appearance and placement of the control used to represent the class member. In addition to entries for class members, the View Descriptor can contain entries for visual enhancements that are used to indicate user interface states and provide visual cues to the user. These include bitmaps, text labels, and background colors. There is a unique View Descriptor created for each view that is defined for an instrumented object. An instrumented object can have an infinite number of View Descriptors associated with it. In one embodiment of the invention the View Descriptor entry consists of the following:

Control type—A numerical identifier indicating the type of control.

Class index—This is the index of the class table entry for the item.

Control Info handle—This is a handle to a structure that provides the information needed to create a particular control. This information can include the following:

Size—Width and height of the control.

Placement—Where the control will appear in its parent view.

Colors—Colors associated with control.

Font—The type and size of font used by the control.

Each control type has its own unique control info structure that contains all the data necessary for creating the control specified by "Control type."

Object Descriptor—This data structure is created by the Visualization Engine and initialized by the instrumented object's Initialize Descriptor polymorphic function. A new Object Descriptor is created whenever an object instance is visualized. It contains the same number of entries as the View Descriptor. Each entry contains information about the user interface element created and information about the object member it represents. This information is used to maintain synchronization between the user interface element and its associated object member. In one embodiment of this invention the Object Descriptor entry consists of the following:

Control handle—This is a handle to the control that represents a particular data member. It is used to access the data within the control.

View Descriptor Entry handle—This is the handle of the View Descriptor entry that is used to create the user interface control. It is used to access the data within the instrumented object.

The Visualization Engine

As mentioned earlier the Visualization Engine is a block of functionality that interacts with the instrumented objects to create object visualizations and maintain synchronization between the objects and those visualizations. It accomplishes the visualization process by creating and utilizing the four data structures described above. The Visualization Engine comprises the following four functional blocks:

Object Manager—The Object Manager manages the interaction between the instrumented object system and the Visualization Engine. It handles the creation of the Global Class Table. It handles the getting and setting of data within the objects and it handles the manipulation of the object through the object's manipulation functions added during instrumentation.

Visualization Manager—The Visualization Manager handles the view creation and manipulation requests that come from the instrumented objects. It interacts with the instrumented objects' Initialize Descriptor function to create the Class, View and Object Descriptors described above. During the view creation process it interacts with the Repository Manager to load previously defined View Descriptors that are stored in the View Repository and to load any bitmap or other graphical resources used by the view from the Resource Repository. During the view creation process it also interacts with the Object Manager to get the data that is to be visualized. Once a view is created it interacts with the Synchronization Manager to add the newly created view to the list of views that need to be synchronized.

Synchronization Manager—The Synchronization Manager keeps track of the objects that are currently being visualized and their associated views. Whenever data is input by the user, it notifies the instrumented object by calling its Data Synchronization function. The Synchronization Manager periodically validates the data contained in the views with the data contained in the objects. If any changes are detected, the Synchronization Manager will update the data within the views to match the data contained with the objects.

Repository Manager—The Repository Manager keeps track of views stored in the View Repository and bitmaps or other graphical resources that are external to the program but that are used by views stored in the Resource Repository.

When a program that includes the present invention is compiled and executed the first time, one of the first things that the Visualization Engine does is to create a database called the View Repository. The View Repository contains one Class Descriptor and one or more View Descriptors for each object class that is represented in the user interface. Initially no Class or View Descriptors will exist in the View Repository, and the View Repository will become populated in the following manner.

During program execution, the program will tell an object to create a view of itself by calling one of the object's view creation functions. Alternatively, the program will pass the initial object to be visualized to the Visualization Engine during initialization, which tells the object to create a view of itself. The Visualization Engine interacts with the instrumented object to create or add to the data structures described above and then utilizes these structures to create a view of an object. A high level flowchart of this process is shown in FIG. 10.

Figure 10:
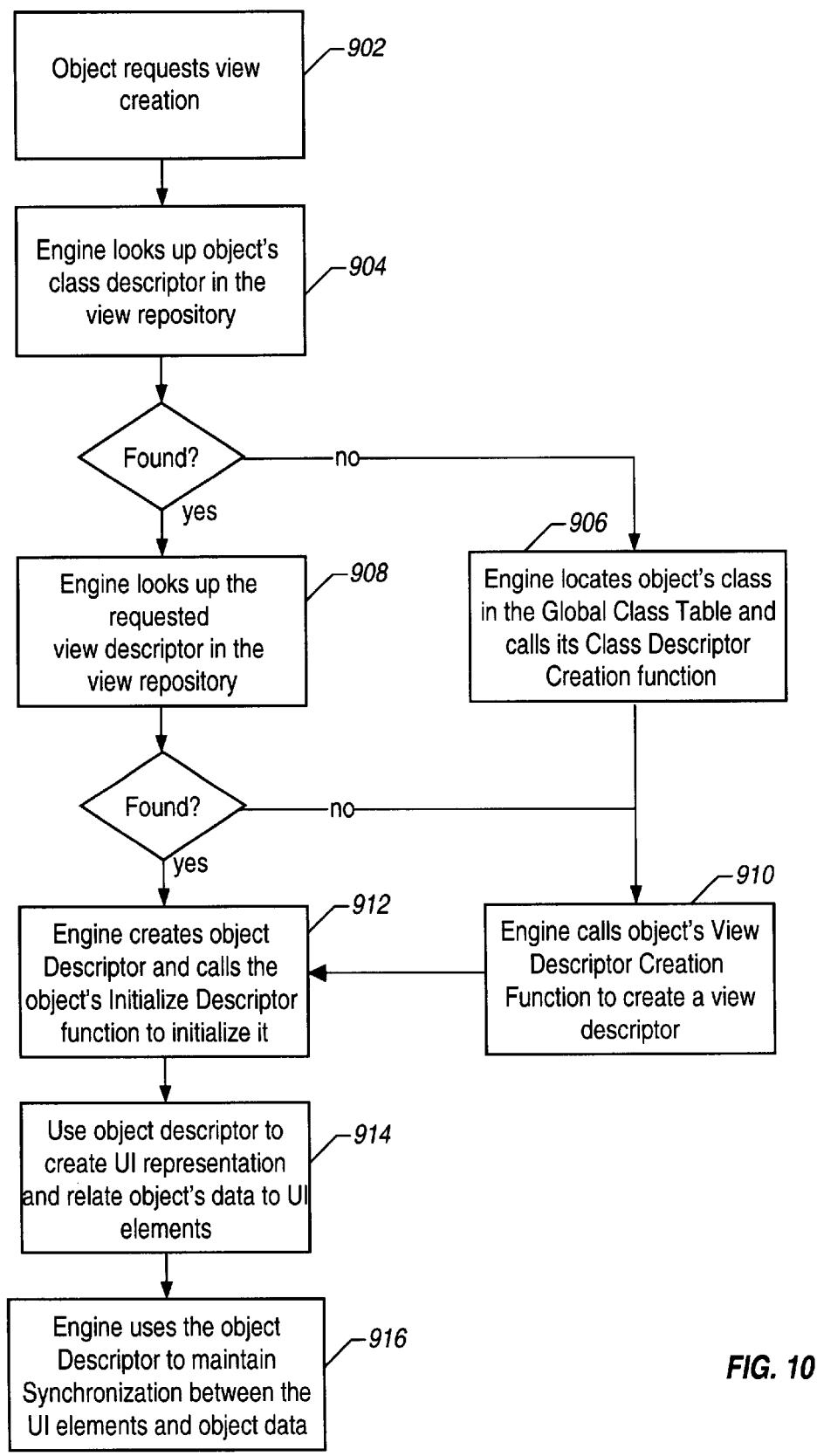
FIG. 10 is a high-level flowchart illustrating how the Visualization Engine interacts with objects and with the visual object base class to create views.
Figure 11:
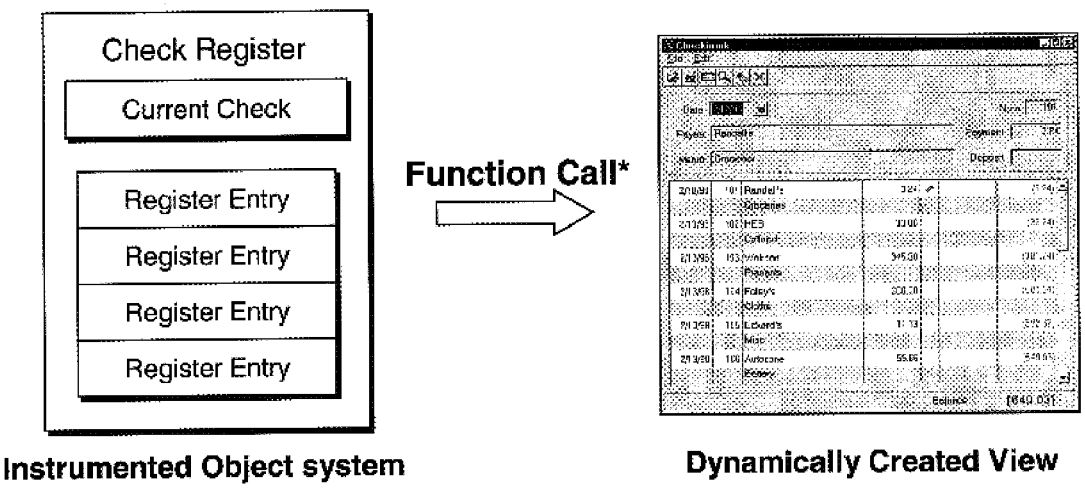
FIG. 11 illustrates the creation of a view from an instrumented object system via a function call.

Referring to FIG. 10, at block 902, an object created from an instrumented object class requests the creation of a view by calling one of the view creation functions inherited from VObject. The function call includes parameters that indicate the type of view to create, the name of the view to be created, and the location to create the view. This is shown conceptually, again in the context of the check register program example, in FIG. 11. In the check register program, the programmer or the Visualization Engine would tell the check register object to create a view of itself by calling one of its view creation functions. This function call causes the object to interact with the Visualization Engine and create the requested view. The object does this by passing its class name, its Visual Object handle, and the view type, view name and location information to the Visualization Engine.

Returning to FIG. 10, the Visualization Engine uses the class name to look up the Class Descriptor for the object in the View Repository at 904. If there is no entry in the View Repository for the object, then the Visualization Engine uses the object's class name to look up the class entry in the Global Class Table. It then calls the Class Descriptor Creation global class function to create a Class Descriptor for the new object type, which is added as a new entry to the View Repository. This sequence is shown at block 906 on FIG. 10.

The Visualization Engine uses the class name, view type and view name to look up the View Descriptor for the requested view in the View Repository, shown at block 908. If the requested View Descriptor is in the View Repository then it loaded and any graphical resource that is specified in the View Descriptor is loaded from the Resource Repository. If the requested View Descriptor is not in the View Repository, then the Visualization Engine creates an empty View Descriptor and calls the object's Initialize Descriptor function which initializes the new View Descriptor for the object. This action is shown at block 910 on FIG. 10.

Having either found a resident View Descriptor or created a new View Descriptor for the object being visualized, the Visualization Engine next creates a new Object Descriptor and calls the object's Initialize Descriptor function, passing it the new Object Descriptor, the Class Descriptor, and the View Descriptor information. This is shown at 912. The object uses this information to initialize the Object Descriptor for the object being visualized.

The Visualization Engine uses the Object Descriptor to create the object's user interface elements and updates the Object Descriptor with information about user interface elements, shown at block 914 in FIG. 10. Finally, at 916, the Visualization Engine maintains synchronization and coherence between the visual representations of the object and the data members within the object. This means that when the user interacts with the view, by making selections or entering or adjusting data values, the underlying data members are updated automatically. The reverse is also true; i.e., if the value of an underlying data member is changed during program execution then any visual representations are automatically changed.

As described above, initially no View Descriptors reside in the View Repository. The sequence shown in FIG. 10 will populate the View Repository with a set of default View Descriptors for the object being visualized and for any objects that are contained within it. At this point, the programmer may choose to edit the View Descriptors in the View Repository or to add new descriptors using a block of functionality called the "View Editor" which is an optional part of the Visualization Engine. In essence, the View Editor allows the programmer to create the default user interface for the program—the interface that the user will experience the first time he runs the program. Program developers may choose to ship their programs with the View Editor fully enabled, thus enabling their users to modify the default interface as desired. Alternatively, programmers may choose to ship the final version of the software without the View Editor, or with a limited View Editor that allows the user to modify only certain portions of the interface.

The View Editor provides an interactive method for creating and editing views. It allows the programmer (or user, if the View Editor is included in the final version of the software) to select one of the classes that is in the Global Class Table and to select the type of view they wish to create or edit. If the programmer wants to edit an existing view, he can specify an existing view name; otherwise, he can specify a new view name.

The View Editor then calls the Default Object Constructor for the selected object class to create an object instance to use during the editing process. If a new view is desired, then a new View Descriptor is created; otherwise, the existing View Descriptor is loaded from the View Repository. The desired view is then created and displayed with the View Editor.

At this point, the programmer or user can make any desired changes. They can modify or delete existing controls, or they select an object member to add to the view. If the programmer or user chooses to add a new object member, he will be presented with a list of compatible controls with which to represent the member. The selected control is then created and displayed within the view and an entry is add to the View Descriptor that describes all aspects of the new control including its type, size, location, color(s), font and so forth.

The View Editor allows the programmer to create appropriate visualizations for all the objects within an object system, enabling the entire system to be visually represented to the user without the need to write explicit user interface code. The View Editor also allows users to freely modify the user interface to meet their individual needs or to customize their interaction with the program. Moreover, using the View Editor, program users dynamically create and customize views—while the program is running—which are then immediately available to the user to interface with the program.

To summarize, the present invention comprises a method and apparatus that automatically creates the user interface in an object-oriented software program. The present invention includes a visual object base class that comprises functions that support the creation and management of views, one or more instrumented object classes that are subclasses of the visual object base class and from which instrumented objects are created, and a Visualization Engine. Each instrumented object class further comprises a block of functions that define one or more of the class members to be visual elements that are capable of being represented in the user interface environment. The Visualization Engine further comprises an Object Manager, a Visualization Manager, a Synchronization Manager, and a Repository Manager. The Visualization Engine interacts with the visual object base class and each instrumented object created from the instrumented object classes, and, using a Global Class Table, a Class Descriptor, a View Descriptor, and an Object Descriptor, creates views of the instrumented objects and maintains synchronicity between the views and the underlying object members by generating the appropriate commands to the operating system. Each view created by the Visualization Engine comprises a representation of one or more of the visual elements of each instrumented object that is meaningful to a human user.

The present invention also comprises a View Editor that enables real-time interactive modification of object views. The present invention also allows instrumented object classes to be derived from other instrumented object classes, and when this occurs, views associated with the parent instrumented object class are inherited by the derived instrumented object class.

Other embodiments of the invention will be apparent to those skilled in the art after considering this specification or practicing the disclosed invention. The specification and examples above are exemplary only, with the true scope of the invention being indicated by the following claims.

I claim the following invention:

1. A method of generating a user interface for an instrumented object within an object-oriented software program wherein said user interface is generated on a computer or other electronic machine having an operating system, said method comprises:

receiving a view creation request from an instrumented object that requests the creation of a specific user interface view by class name, view type, and view name, wherein said specific user interface view further comprises one or more visual element members of the object class from which said instrumented object was created, wherein said visual element members are members of said object class that have been declared to be visual elements;

generating an object Class Descriptor that corresponds to the object class from which said instrumented object was created, said object Class Descriptor further comprises an entry for each visual element member of said object class, each said entry further comprises the name, data type, and access information for each said visual element member;

generating a View Descriptor that corresponds to said class name, view type, and view name requested by said instrumented object, said View Descriptor associates each said visual element member that will be included in the specific user interface view with type, appearance, and placement of a control used to represent each said visual element member;

creating and initializing an Object Descriptor that corresponds to said instrumented object, said Object Descriptor directs the operating system to create the specific user interface view requested; and maintaining synchronization between each said visual element member represented in the specific user interface view with said visual element members of said instrumented object.

2. The method of claim 1, further comprising using a View Editor to generates said view creation request, wherein said View Editor requests a specific user interface view for an instrumented object by class name, view type, and view name, wherein said view name is either an existing view name or a new view name specified to create a new specific user interface view.

3. The method of claim 1, wherein said instrumented object further comprises an instrumented object derived from another instrumented object class, and said view creation request further requests the creation of a specific user interface view by view name that is inherited from said instrumented object class.

4. The method of claim 1, further comprising storing said Class Descriptor and said View Descriptor in a View Repository, searching said View Repository for a match to said view creation request, and retrieving said View Descriptor and said Class Descriptor from said View Repository when there is a match.

5. A program storage device readable by a computer that tangibly embodies a program of instructions executable by the computer to perform a method of generating a user interface for an instrumented object within an object-oriented software program wherein said user interface is generated on a computer or other electronic machine having an operating system, said method comprises:

receiving a view creation request from an instrumented object that requests the creation of a specific user interface view by class name, view type, and view name, wherein said specific user interface view further comprises one or more visual element members of the object class from which said instrumented object was created, wherein said visual element members are members of said object class that have been declared to be visual elements;

generating an object Class Descriptor that corresponds to the object class from which said instrumented object was created, said object Class Descriptor further comprises an entry for each visual element member of said object class, each said entry further comprises the name, data type, and access information for each said visual element member;

generating a View Descriptor that corresponds to said class name, view type, and view name requested by said instrumented object, said View Descriptor associates each said visual element member that will be included in the specific user interface view with type, appearance, and placement of a control used to represent each said visual element member;

creating and initializing an Object Descriptor that corresponds to said instrumented object, said Object Descriptor directs the operating system to create the specific user interface view requested; and maintaining synchronization between each said visual element member represented in the specific user interface view with said visual element members of said instrumented object.

6. The program storage device of claim 5, wherein said method further comprises using a View Editor to generate said view creation request, wherein said View Editor requests a specific user interface view for an instrumented object by class name, view type, and view name, wherein said view name is either an existing view name or a new view name specified to create a new specific user interface view.

7. The program storage device of claim 5, wherein said instrumented object further comprises an instrumented object derived from another instrumented object class, and said view creation request further requests the creation of a specific user interface view by view name that is inherited from said instrumented object class.

8. The program storage device of claim 5, further comprising storing said Class Descriptor and said View Descriptor in a View Repository, searching said View Repository for a match to said view creation request, and retrieving said View Descriptor and said Class Descriptor from said View Repository when there is a match.

9. A user interface generation apparatus that generates a user interface on a computer or other electronic machine having an operating system, comprising:

an instrumented object created from an object class within an object-oriented software program executing on an electronic machine having an operating system, said object class includes one or more visual element members;

one or more view creation requests generated by said instrumented object, said view creation request requests the creation of a specific user interface view by class name, view type, and view name;

a Visualization Engine that generates an object Class Descriptor, a View Descriptor, and an Object Descriptor;

wherein said object Class Descriptor corresponds to said object class, said object Class Descriptor further comprises an entry for each visual element member of said object class, each said entry further comprises the name, data type, and access information for each said visual element member;

wherein said View Descriptor corresponds to said class name, view type, and view name requested by said instrumented object, said View Descriptor associates each said visual element member included in the specific user interface view with type, appearance, and placement of a control used to represent each said visual element member; and wherein said Object Descriptor corresponds to said instrumented object, and directs the operating system to create the specific user interface view requested and maintains synchronization between each said visual element member represented in the specific user interface view with said visual element members of said instrumented object.

10. The apparatus of claim 9, wherein said Visualization Engine further comprises a View Editor that generates said view creation requests, wherein said View Editor requests a specific user interface view for an instrumented object by class name, view type, and view name, wherein said view name is either an existing view name or a new view name specified to create a new specific user interface view.

11. The apparatus of claim 9, wherein said instrumented object further comprises an instrumented object derived from another instrumented object class, and said view creation request further requests the creation of a specific user interface view by view name that is inherited from said instrumented object class.

12. The apparatus of claim 9, further comprising a View Repository that stores said Class Descriptor and said View Descriptor, wherein said Visualization Engine searches said View Repository for a match to said view creation request, and retrieves said View Descriptor and said Class Descriptor from said View Repository when there is a match.

13. A user interface generation system that generates a user interface on a computer or other electronic machine having an operating system, comprising:
- an instrumented object created from an object class within an object-oriented software program executing on an electronic machine having an operating system, said object class includes one or more visual element members;
- one or more view creation requests generated by said instrumented object, said view creation request requests the creation of a specific user interface view by class name, view type, and view name;
- a Visualization Engine that generates an object Class Descriptor, a View Descriptor, and an Object Descriptor;
- wherein said object Class Descriptor corresponds to said object class, said object Class Descriptor further comprises an entry for each visual element member of said object class, each said entry further comprises the name, data type, and access information for each said visual element member;
- wherein said View Descriptor corresponds to said class name, view type, and view name requested by said instrumented object, said View Descriptor associates each said visual element member included in the specific user interface view with type, appearance, and placement of a control used to represent each said visual element member; and
- wherein said Object Descriptor corresponds to said instrumented object, and directs the operating system to create the specific user interface view requested and maintains synchronization between each said visual element member represented in the specific user interface view with said visual element members of said instrumented object.

14. The system of claim 13, wherein said Visualization Engine further comprises a View Editor that generates said view creation requests, wherein said View Editor requests a specific user interface view for an instrumented object by class name, view type, and view name, wherein said view name is either an existing view name or a new view name specified to create a new specific user interface view.

15. The system of claim 13, wherein said instrumented object further comprises an instrumented object derived from another instrumented object class, and said view creation request further requests the creation of a specific user interface view by view name that is inherited from said instrumented object class.

16. The system of claim 13, further comprising a View Repository that stores said Class Descriptor and said View Descriptor, wherein said Visualization Engine searches said View Repository for a match to said view creation request, and retrieves said View Descriptor and said Class Descriptor from said View Repository when there is a match.

17. A method that makes a user interface generation apparatus that generates a user interface on a computer or other electronic machine having an operating system, comprising:
- providing an instrumented object created from an object class within an object-oriented software program executing on an electronic machine having an operating system, said object class includes one or more visual element members;
- providing one or more view creation requests generated by said instrumented object, said view creation request requests the creation of a specific user interface view by class name, view type, and view name; and
- providing a Visualization Engine that generates an object Class Descriptor, a View Descriptor, and an Object Descriptor;
- wherein said object Class Descriptor corresponds to said object class, said object Class Descriptor further comprises an entry for each visual element member of said object class, each said entry further comprises the name, data type, and access information for each said visual element member;
- wherein said View Descriptor corresponds to said class name, view type, and view name requested by said instrumented object, said View Descriptor associates each said visual element member included in the specific user interface view with type, appearance, and placement of a control used to represent each said visual element member; and
- wherein said Object Descriptor corresponds to said instrumented object, and directs the operating system to create the specific user interface view requested and maintains synchronization between each said visual element member represented in the specific user interface view with said visual element members of said instrumented object.

18. The method of claim 17, wherein said Visualization Engine further comprises a View Editor that generates said view creation requests, wherein said View Editor requests a specific user interface view for an instrumented object by class name, view type, and view name, wherein said view name is either an existing view name or a new view name specified to create a new specific user interface view.

19. The method of claim 18, wherein said instrumented object further comprises an instrumented object derived from another instrumented object class, and said view creation request further requests the creation of a specific user interface view by view name that is inherited from said instrumented object class.

20. The method of claim 18, further comprising providing a View Repository that stores said Class Descriptor and said View Descriptor, wherein said Visualization Engine searches said View Repository for a match to said view creation request, and retrieves said View Descriptor and said Class Descriptor from said View Repository when there is a match.

* * * * *